April 1, 1958     A. D. PARNIE     2,828,876
VEHICULAR LOAD HANDLING APPARATUS
Filed Feb. 8, 1956     3 Sheets-Sheet 1
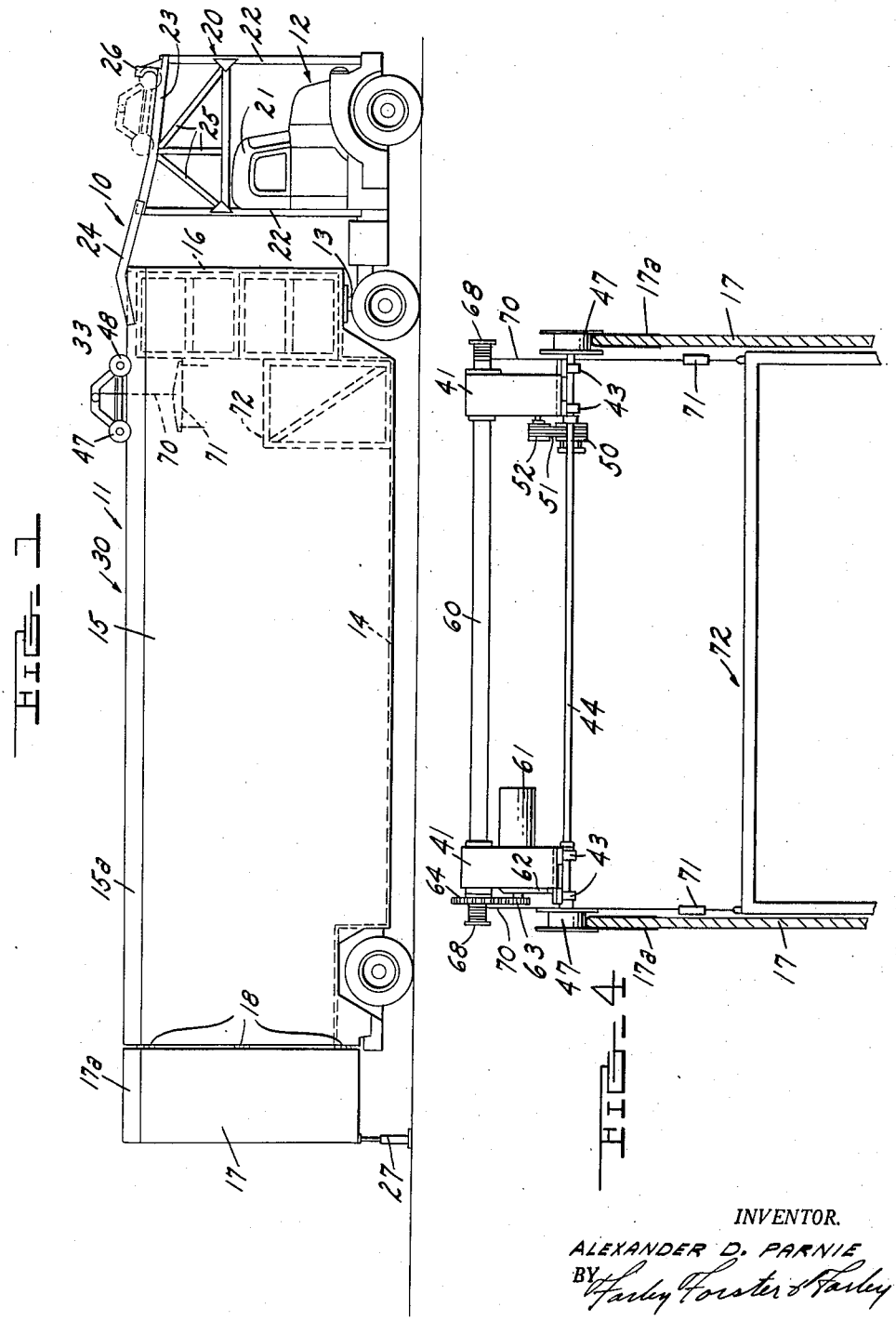
INVENTOR.
ALEXANDER D. PARNIE
BY Harley Forster & Harley
ATTORNEYS April 1, 1958 — A. D. PARNIE — 2,828,876
VEHICULAR LOAD HANDLING APPARATUS
Filed Feb. 8, 1956 — 3 Sheets-Sheet 2
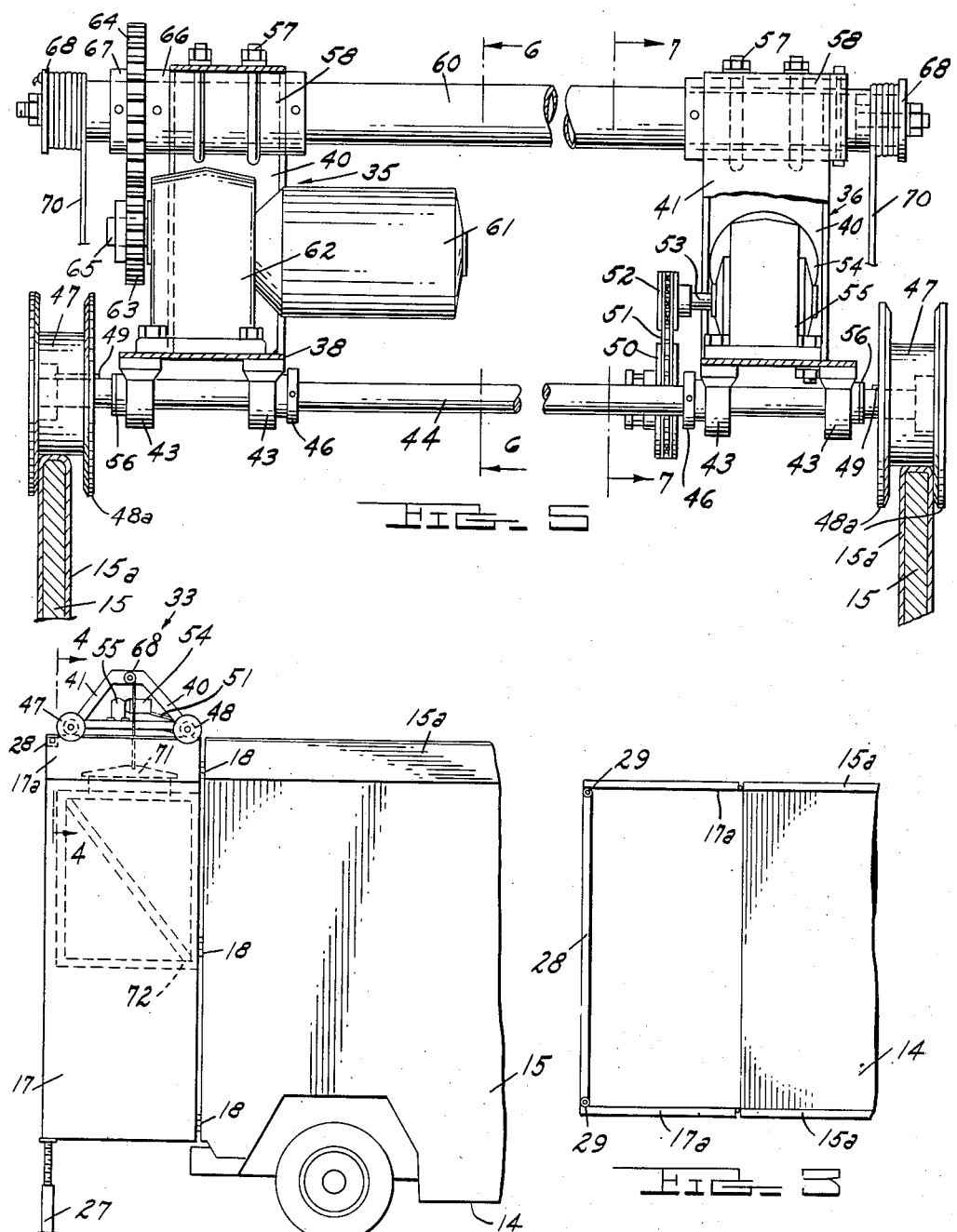
INVENTOR.
ALEXANDER D. PARNIE
BY Harley Forster & Harley
ATTORNEYS April 1, 1958 A. D. PARNIE 2,828,876
VEHICULAR LOAD HANDLING APPARATUS
Filed Feb. 8, 1956 3 Sheets-Sheet 3
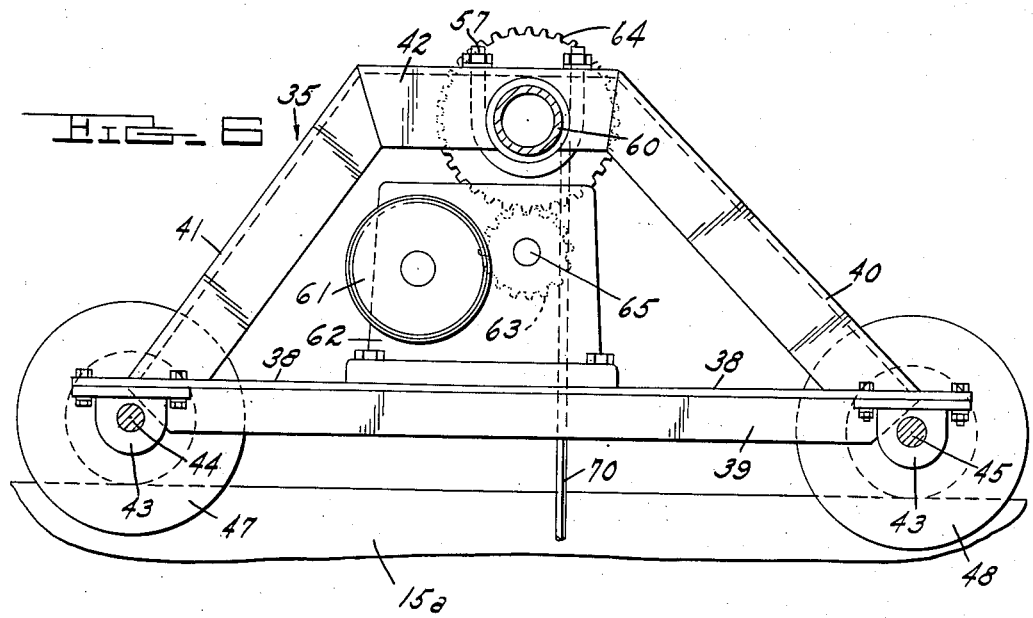
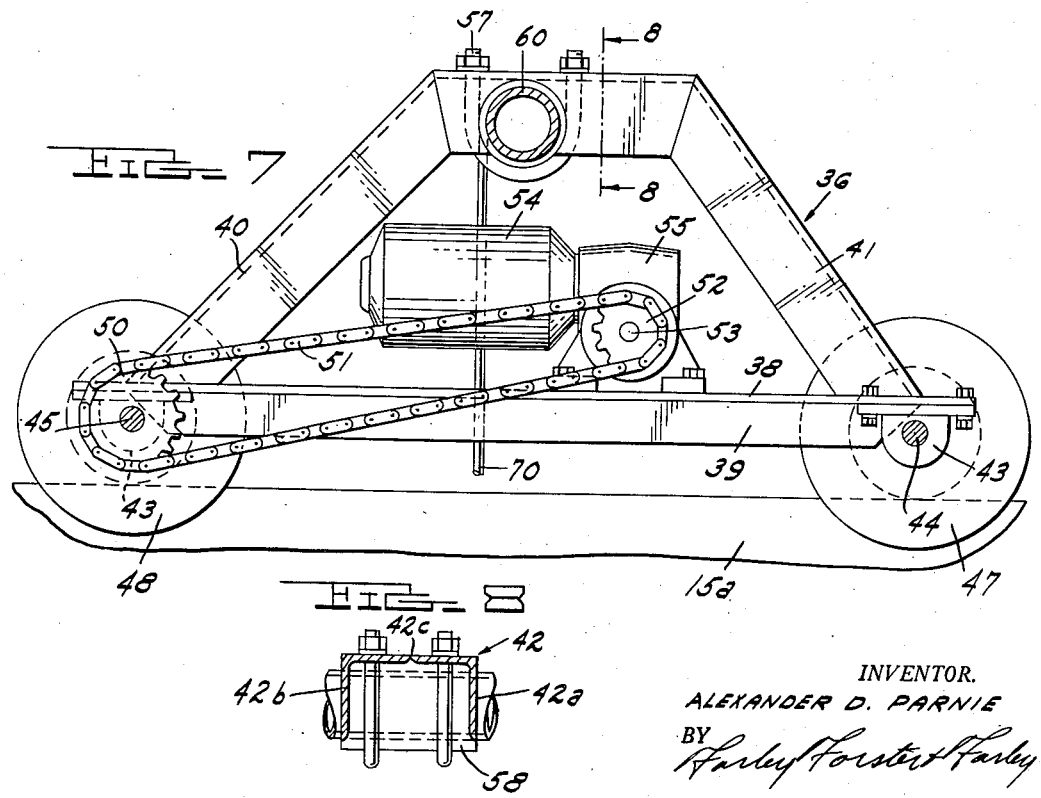
INVENTOR.
ALEXANDER D. PARNIE
BY
ATTORNEYS United States Patent Office 2,828,876
Patented Apr. 1, 1958

2,828,876

VEHICULAR LOAD HANDLING APPARATUS

Alexander D. Parnie, Birmingham, Mich., assignor to Trailerack Transit, Inc., Flint, Mich., a corporation of Delaware Application February 8, 1956, Serial No. 564,148

11 Claims. (Cl. 214—75)

The present invention relates to load handling apparatus for a vehicle and particularly to apparatus carried by a vehicle for positioning or shifting of a load therein.

Serious material handling problems have long existed in the loading, unloading, or shifting of bulky and cumbersome articles, such as household appliances, or like articles which are too large and heavy to handle by hand, into and out of a truck, truck-trailer, or similar vehicular compartment. These problems have not been eliminated by the use of pallet-handling procedures, since fork lift trucks or similar handling equipment is not always available, particularly at unloading stations. The use of built-in overhead cranes in trailers or trucks has been proposed, but has found little acceptance, due to initial cost, serious loss in overhead storage space, and decreased load carrying capacity resulting from gross weight and overall height restrictions imposed by law.

The present invention provides load handling apparatus carried by the vehicle and operable, if desired, from the vehicular power unit, which dos not reduce the overhead storage space in the vehicular compartment, which does not increase the overall height of the vehicle, which does not materially decrease the pay load weight of the vehicle, and which can be utilized to load and unload bulky articles from a loading dock or from ground level into or from the vehicular compartment. Thus, the present invention provides for the first time an efficient, self-contained, commercially feasible load handling system for the loading or unloading of a vehicular compartment with bulky articles or combined unit loads too large and cumbersome to be efficiently handled manually.

The apparatus of the present invention is particularly adaptable for use with an open topped vehicular compartment, either formed as an integral part of the prime mover or as a vehicular trailer adapted for use with a prime mover. The open topped vehicular compartment has a load supporting floor and parallel, laterally spaced upstanding side walls provided with longitudinally extending tracks above floor level. The load handling apparatus proper preferably takes the form of a hoist equipped with load elevating and lowering means and mounted on a wheeled carriage for movement along the tracks of the compartment side walls. The carriage or hoist is preferably self-propelled and can traverse the entire length of the compartment.

Preferably also, the tracks are formed by the upper longitudinally extending edges of the side walls, and the engagement between these tracks and the wheels of the hoist is such that the hoist carriage structure forms a transverse connection between side walls, thereby eliminating the need for upper transverse braces between side walls. Either double flanged wheels or tracks can be employed to provide this engagement.

To facilitate loading and unloading of the compartment, the compartment is preferably provided with a pair of hinged doors transversely closing the rear end of the compartment, but which may be swung open into longitudinal alignment with the compartment walls. These doors are provided with tracks which form a continuation of the side wall tracks when the doors are open. The hoist can thereby travel out onto the door tracks at which time it is vertically positioned generally above but beyond the longitudinal confines of the compartment floor. When the hoist is in this position, it may be utilized to lift articles from a loading dock or from the ground level into the cargo compartment. The hoist preferably carries its own motive power for elevating and lowering a load within the vehicular compartment, this power, as well as the propelling power of the hoist, being provided by the prime mover generator or an external source of power, as desired.

Preferably, a transport or storage position for the hoist is provided over the cab of the vehicle or the prime mover. The cab or prime mover is equipped with an elevated track or superstructure which provides laterally spaced, generally parallel supporting surfaces longitudinally aligned or alignable with the tracks of the compartment walls, so that the hoist can be moved away from the compartment. The supporting surfaces over the cab are preferably at a lower level than the compartment wall tracks, so that the hoist is stored forward and below that position which it occupies during the loading or unloading operation. In the event that the load compartment is in the form of a trailer for use with a prime mover, a simple removable bridging track section is employed to accommodate movement of the hoist from the compartment wall tracks to the storage surfaces over the cab. The provision of this storage position reduces the overall height of the vehicle and hoist and shifts the weight of the hoist to the forward, more lightly loaded wheels of the vehicle for transport, thereby minimizing any loss of load carrying capacity. In the case of tractor-trailer vehicles, this storage feature also makes the hoist a part of the equipment of each tractor and thus always available for use with any suitable trailer the tractor may be hauling.

These and other features of the invention will be more apparent from the following detailed description of a preferred embodiment of my invention and from an examination of the drawings disclosing such embodiment wherein:

On the drawings:

Fig. 1 is a side elevational view of an automotive vehicle equipped with a material handling apparatus of the present invention, the apparatus being shown in its solid line position in a normal working position during loading or unloading of the vehicular cargo compartment, and being shown in its dotted line position in its storage position;

Fig. 2 is an enlarged fragmentary elevational view similar to Fig. 1, but illustrating the device in its loading or unloading position in which the trailer doors are utilized;

Fig. 3 is a fragmentary plan view of that portion of the device illustrated in Fig. 2, the hoisting apparatus being removed for clarity of illustration;

Fig. 4 is an enlarged sectional view taken along the plane 4—4 of Fig. 2;

Fig. 5 is a greatly enlarged view similar to Fig. 4, with parts broken away and in section, illustrating the hoist;

Fig. 6 is a sectional view taken along the plane 6—6 of Fig. 5;

Fig. 7 is a sectional view taken along the plane 7—7 of Fig. 5; and

Fig. 8 is a sectional view taken along the plane 8—8 of Fig. 7.

As shown in the drawings:

In Fig. 1, reference number 10 refers generally to a commercial vehicle or truck having a vehicular trailer 11 coupled to and powered by a prime mover or tractor 12. The trailer 11 is of the semi-type and is pivotally connected to the prime mover 12 by the usual fifth wheel construction indicated generally at 13.

As best illustrated in Figs. 1 through 4, inclusive, the vehicular trailer 11 encloses an open topped vehicular compartment defined by a floor 14, laterally spaced, upstanding, longitudinally extending, generally parallel side walls 15 which may be reinforced along their upper edges, as at 15a, so as to provide generally horizontal, parallel, laterally spaced surfaces which are utilized as guide tracks in a manner to be hereinafter more fully described. The forward end of the vehicular compartment is closed by front wall 16, and the rear end of the compartment is enclosed by laterally swingable trailer doors 17 which are hinged, as at 18, to the rearmost edges of the side walls 15, the doors being swingable laterally about the hinges 18 into general longitudinal alignment with the side walls 15. The doors 17 may also be reinforced, as at 17a, to provide guide tracks which serve as extensions of the tracks provided on the upstanding side walls 15.

The prime mover or tractor 12 is provided with a storage frame 20 generally overlying the passenger compartment or cab 21. This frame 20 includes upstanding corner posts 22 carrying at their upper edges track members 23 which are laterally spaced through a distance substantially equal to the distance between the upper edges of the side walls 15 of the trailer, the members 23 being displaced below and generally forwardly of the upper wall edges. The track members 23 may each be joined to one of the upper wall edges by a removable bridge section 24. The bridging sections 24 are removable to accommodate relative fifth wheel pivotal movement between the prime mover 12 and the trailer 11. The corner posts 22 are joined to one another and to the guide elements 23 by suitable angularly disposed reinforcing trusses or the like 25.

From the foregoing description, it will be appreciated that when the prime mover 12 and the trailer 11 are longitudinally aligned and the bridge sections 24 are in their illustrated positions, and the doors 17 are open, a longitudinally extending trackway is provided from adjacent the forward end of the prime mover to the extreme rear end of the trailer as defined by the open doors 17. This trackway comprises laterally spaced, parallel guide surfaces defined by the track members 23, the bridge sections 24, the upper edges of the side walls 15 and the upper edges of the doors 17.

To prevent displacement of the hoisting apparatus, to be later described, from the storage position defined by the track members 23, an upstanding abutment 26 is welded or otherwise secured to each of the members 23 adjacent the forward end thereof.

To remove from the pivotal hinge connection 18 between the doors 17 and the trailer side walls 15 the load of the hoisting apparatus and any load raised thereby, portable supporting jacks 27 (Figs. 1 and 2) of conventional design are placed beneath each of the trailer doors when the doors are opened and prior to the initiation of the loading or unloading operation. The doors 17 are braced against lateral movement during such loading or unloading operations by means of a laterally extending beam 28 pinned or otherwise connected, as at 29, to the extreme upper rear end of each door.

It will be appreciated that all of the foregoing description has been premised upon the utilization of a semi-trailer and tractor or prime mover unit such as illustrated in Fig. 1. Obviously, a similar trackway may be provided for a truck or similar vehicle in which the prime mover and the storage compartment defining walls are integral or mounted upon the same frame. This somewhat smaller, standard type truck will readily provide the same type of trackway and may be equipped in the manner herebefore described, although the utilization of the removable bridging sections 24 will not be necessary.

In Figs. 5, 6, and 7 there is illustrated a particular form of load elevating or lowering, self-propelled hoist which has been found to be well adapted to utilization in the load handling system of the present invention.

As illustrated in detail in these three figures of the drawings, the hoist comprises a pair of laterally spaced side frames indicated generally at 35 and 36, the frames being of generally trapezoidal configuration. Each frame includes a base plate 38 having one or more reinforcing ribs 39 depending therefrom. Each base plate 38 has at each end thereof a generally upwardly and angularly extending struts 40, 41, the struts 40, 41 being joined at their upper ends by a frame header 42. As illustrated in Fig. 8, the struts 40 and 41 and the header 42 are each of channeled configuration, the channel being defined by a pair of angle irons 42a and 42b having their short legs butt welded together, as at 42c.

As best illustrated in Fig. 5, a pair of laterally spaced plane bearings 43 are secured to the undersurface of each base plate 38 adjacent each end thereof, the bearings preferably being of the self-aligning pillow block type. These bearings 43 serve to journal therein laterally or transversely extending axle shafts 44 and 45. The shaft 45 and the shaft 44 each have secured to the axial extremities thereof wheels 47 (on shaft 44) and wheels 48 (on shaft 45). The wheels 47 and 48 are each secured to the shafts for co-rotation, as by keys 49 (Fig. 5). Adjustable collars 46 are mounted on each shaft 44 and 45 adjacent the bearings 43 and serve, together with fixed collars 56, to establish the positions of each shaft relative to each side frame, so that the shafts 44 and 45 form transverse connecting members between the side frames 35 and 36.

The axle 45 is the driving axle of the hoist and has co-rotatably secured thereto a sprocket 50 (Fig. 7) which is connected by a link chain 51 to a driving sprocket 52 mounted upon and co-rotatable with an output shaft 53 driven by a power source, such as an electric motor 54. Preferably, the output shaft 53 is connected to the motor through a reduction gear box 55, so that operation of the motor will rotate the shaft 45 at a proper, relatively low, rate of speed for advancing the hoist longitudinally along the trackway. The wheels 47 and 48 are of the double flange type having flanges 47a and 48a which are spaced axially to an extent sufficient to freely, but guidingly, receive therebetween the upper edges 15a of the compartment sides 15. Of course, these flanges 48a also serve to provide a lateral connection between the compartment side walls through the hoist structure. No other structure need be employed for transversely connecting the upper portions of the side walls 15, thereby saving weight as well as making the load compartment more accessible.

U-bolts 57 are mounted on the headers 42 of the two laterally spaced frames 35 and 36 to secure bushings 58 which are axially aligned to receive an elongated hoist shaft 60. This hoist shaft 60 is preferably tubular, to reduce the weight of the assembly, and is adapted to be driven by a second source of power, such as an electric motor 61, through a reduction gear box 62 and a pair of pinions 63 and 64, the pinion 63 being secured to the output shaft 65 of the gear box 62, and the pinion 64 being secured to the tubular shaft 60 by suitable means, as by locking collars 66 and 67 (Fig. 5). The extreme ends of the tubular shaft 60 are closed by end plates 68, and the end plates 68, being of larger diameter than the shaft, serve to confine hoisting cables 70 on the exterior periphery of the shaft, axially outwardly of the bushings 58 and the pinion 64. Each of these hoisting cables is anchored to the adjacent end plate 68 and the cable is adapted to be wrapped about the ends of the shaft upon rotation of the shaft 60, as by actuation of the motor 61. The depending free end of each cable 70 is secured, by a hook or the like, to a load supporting hanger 71 (Figs. 2 and 4) which in turn is adapted to be secured to the load or work-piece, indicated generally at 72.

Thus, it will be seen that the hoist illustrated in detail in Figs. 5, 6, and 7 is extremely simple in its construction and operation with the actuating motors 54 and 61 and the gear boxes 55 and 62 being carried by the base plates 38. These base plates 38 also carry the superstructure composed of the struts 40 and 41 and the headers 42 for carrying the lifting shaft 60 in an elevated position. The elevated position of the lifting shaft 60 makes possible the elevation of the load to the top of the trailer or other compartment-defining vehicular components. The use of the motor 54 and the gear box 55 to advance the hoist longitudinally insures the rapid and easy shifting of the load from its loading position at the rear end of the side walls 15 or upon the doors 17 to any desired position within the compartment. The source of electricity for actuating the motors 54 and 61 may be the prime mover or tractor generator or a general utility line located at the loading or unloading points.

The operation of the device of the present invention will be readily understood by those skilled in the art, but a brief description of this operation is given to further point out the advantages and desirable function of the present invention.

Considering first the loading of bulky crates or similar articles into the vehicular compartment, the apparatus is preferably in the position illustrated in Fig. 1 of the drawings, wherein the doors 17 are opened and braced by the jacks 27 and the transverse beam 28. Under these circumstances, the hoist 33 is advanced rearwardly to overlie the upper door edges 17a (as illustrated in Fig. 2) to lift a workpiece 72 from the loading dock or from the ground level. The workpiece 72 is elevated between the doors sufficiently to clear the rear wheel housing of the vehicle and is advanced forwardly, as toward the prime mover 12 to position the load within the compartment. Next, the hoist shaft 60 is rotated to lower the workpiece into the compartment either to rest upon the compartment floor 14 or upon the previously loaded workpiece 72. This loading operation is repeated until the compartment is completely loaded, at which time the door jacks 27 and brace 28 are removed and the doors 17 are closed. The hoist 33 is advanced longitudinally of the vehicle 10 to its storage position illustrated in dotted outline in Fig. 1. In the event that the vehicle is of the tractor and trailer type, as illustrated specifically in Fig. 1, this forward movement of the hoist traverses the hoist of the forward end of the trailer side walls 15, onto the bridging members 24, and forwardly and downwardly onto the track members 23. The hoist is now positioned over the cab 21 of the vehicle in its inoperative position and at a level lower than that level which the hoist would occupy upon the trailer side walls 15. Thus, the movement of the hoist to its forward inoperative position lowers the overall height of the assembly, and also removes all obstructions from the upper reaches of the side walls so that the open topped compartment can now be covered with a tarpaulin or other cover. The bridging members 24 are now removed and the tractor and trailer may now be driven and maneuvered in the ordinary course of their operation.

Upon arrival of the vehicle at the point of unloading, the foregoing procedure is merely reversed with the bridging members 24 being positioned to join the support elements 23 to the upper edges 15a of the side walls 15, and the hoist motor 54 is energized to advance the hoist to the rear end of the trailer and upon the upper reaches of the doors 17, if such is desired. Of course, in the use of some loading docks, it might not be necessary to utilize a door 17, and in which event, the jacks 27 and the brace 28 are not installed, but the doors are merely opened and pivoted forwardly to lie flush against the outer surfaces of the side walls 15 so as not to interfere with the loading or unloading operation.

The loading procedure is now merely reversed with the hoist elevating the workpiece 72 within the compartment and then conveying the workpieces rearwardly for discharging at the rear end of the compartment.

When the unloading has been completed, the hoist is again advanced to its inoperative position, illustrated in Fig. 1 in dotted outline, and the truck and trailer are now ready for highway operation upon removal of the bridging members 24.

One other advantage resides in the provision of the supporting frame 20 overlying the cab or tractor of the vehicle. This makes possible the utilization of one hoist for each tractor. In large scale fleet operations, the number of trailers in use generally exceed the number of tractors so that the trailers may be accumulated at the point of loading or unloading and equipment is not tied up awaiting these operations. Thus, by providing the hoist over the tractor, a hoist is always available whenever an actual loading and unloading operation is being effected and a smaller number of hoists may be provided than would be necessary were the hoist to be mounted upon or formed as a part of the trailer itself.

While preferred embodiments have been described above in detail, it will be understood that numerous modifications might be resorted to without departing from the scope of my invention as defined in the following claims.

I claim:

1. In a material handling apparatus for use with a vehicle having an open topped cargo compartment defined by upstanding laterally spaced side walls terminating in upper, longitudinally extending, generally parallel edges and a driver's compartment longitudinally alignable with said cargo compartment, means superimposed over said driver's compartment defining a pair of laterally spaced guide surfaces longitudinally alignable with said wall edges and at a level below that of said wall edges, and a hoist having guide means engageable with said wall edges and said guide surfaces for movement therealong, said hoist when positioned over said cargo compartment being adapted to shift the load therein and when on said guide surfaces being positioned for storage at said lower level to reduce the overall height of said apparatus.

2. In a material handling apparatus, a vehicle having an open topped cargo compartment defined by upstanding laterally spaced side walls terminating in upper, longitudinally extending, generally parallel edges, a pair of laterally spaced guide surfaces longitudinally alignable with said wall edges and at a level below that of said wall edges and longitudinally spaced from said cargo compartment, and a hoist having guide means engageable with said wall edges and said guide surfaces for movement therealong, said hoist when positioned over said cargo compartment being adapted to shift a load therein and when on said guide surfaces being positioned for storage at a lower level to reduce the overall height of said apparatus.

3. In a material handling apparatus comprising a vehicular prime mover, a vehicular trailer adapted to be coupled to said prime mover in longitudinal alignment therewith, said trailer having an open topped cargo compartment defined by a floor and upstanding side walls terminating in upper longitudinal guide edges, doors hingeably connected to said side walls, respectively, for movement to an open position at which the upper edges of said doors are respectively longitudinally aligned with said side wall edges to project beyond said floor, the prime mover having a roof section appreciably lower than the edges of said side walls and provided with guide rails longitudinally alignable with said edges, a removable joining track for connecting said side rails with said edges and a hoist longitudinally movable along said edges, said rails, said track, and said door upper edges to a first loading station upon said door edges for elevating a load into said cargo compartment, to a second load-positioning station at which said hoist is movable along said wall edges, and to a third storage station at which said hoist is positioned on said rails over said prime mover and at a lower level.

4. A vehicular material handling apparatus comprising a truck having an open topped cargo compartment defined by floor and upstanding side walls terminating in upper longitudinal guide edges, doors hingeably connected to said side walls, respectively, for movement to an open position at which the upper edges of said doors are respectively aligned with said side wall edges to project beyond said floor, a truck cab having a supporting section appreciably lower than the edges of said side walls and provided with guide rails longitudinally alignable with said edges, a carriage longitudinally movable along said guide edges, said guide rails, and said door upper edges, and load elevating and lowering means on said carriage, said carriage and said means being movable to a first loading station on said door edges for elevating a load into said cargo compartment, to a second load-positioning station at which said carriage is movable along said wall edges, and to a third storage station at which said carriage is positioned on said rails over said cab and at a lower level.

5. Article handling apparatus comprising in combination a vehicle having an open topped cargo compartment defined by upstanding laterally spaced side walls terminating in upper, longitudinally extending, generally parallel free edges, a wall interconnecting said side walls at one end of said compartment only, a hoist including a frame having load elevating and lowering means mounted thereon and wheels laterally spaced to engage said upper edges as rails, and means for limiting relative lateral movement between said wheels and each of said upper edges in both directions whereby said hoist frame establishes a longitudinally movable transverse connection between said side walls.

6. Article handling apparatus comprising in combination an open topped vehicle compartment having a floor, upstanding laterally spaced side walls and one end wall partially enclosing said compartment, a door hinged to each of said side walls at the other end of said compartment for opening movement into longitudinal alignment with said side walls and to extend beyond said floor, rail sections formed by the upper free edges of said side walls and end doors, a hoist including a frame having load elevating and lowering means mounted thereon and laterally spaced wheels engaging said rails, and means for limiting relative lateral movement between said wheels and said rails in both directions whereby said hoist frame establishes a longitudinally movable transverse connection between said side walls and doors.

7. Article handling apparatus comprising in combination an open topped vehicle compartment having a floor, upstanding laterally spaced side walls and one end wall partially enclosing said compartment, a member hinged to each of said side walls at the other end of said compartment for opening movement into longitudinal alignment with said side walls and to extend beyond said floor, rail sections formed by the upper free edges of said side walls and end members, a hoist including a frame having load elevating and lowering means mounted thereon and laterally spaced wheels engaging said rails, and means for limiting relative lateral movement between said wheels and said rails in both directions whereby said hoist frame establishes a longitudinally movable transverse connection between said side walls and members.

8. Article handling apparatus comprising in combination a tractor-trailer vehicle, the trailer portion thereof having an open topped cargo compartment defined by a floor and upstanding laterally spaced side walls, means on said side walls defining laterally spaced generally parallel track surfaces above the level of said floor, means carried by the tractor component of said vehicle defining a pair of laterally spaced track surfaces longitudinally alignable with said trailer track surfaces, said tractor track surfaces being positioned at a level below that of said trailer track surfaces, a removable joining track for connecting said tractor and trailer track surfaces and a hoist having guide means engageable with said track surfaces and joining track for movement therealong between a storage station at which said hoist is carried by said tractor track surfaces and a load positioning station at which said hoist is carried by said trailer track surfaces.

9. Article handling apparatus comprising a vehicle having an open topped cargo compartment defined by a floor, upstanding laterally spaced side walls and one end wall, means on said side walls defining laterally spaced generally parallel track surfaces positioned at a level above said floor, means defining a second pair of laterally spaced track surfaces positioned outside said compartment beyond the said end wall thereof and at a level below the level of said first track surfaces, a hoist having guide means engageable with said track surfaces for movement therealong between a storage position on said second track means and a load handling position on said first track means.

10. Article handling apparatus comprising in combination a vehicle having an open top cargo compartment having a floor, upstanding laterally spaced side walls terminating in upper, longitudinally extending, generally parallel free edges, means interconnecting the upper portions of said side walls only at one end of said compartment, means on said side walls defining laterally spaced generally parallel track surfaces above the level of said floor, hoist including a frame having load elevating and lowering means mounted thereon and laterally spaced wheels engaging said track surfaces, and means for limiting relative lateral movement between said wheels and track surfaces in both directions whereby said hoist frame establishes a longitudinally movable transverse connection between the upper portions of said side walls.

11. Article handling apparatus comprising in combination a vehicle having an open top cargo compartment having a floor, upstanding laterally spaced side walls terminating in upper, longitudinally extending, generally parallel free edges, means interconnecting the upper portions of said side walls only at one end of said compartment, a member hinged to each of said side walls at the other end of said compartment for opening movement into longitudinal alignment with said side walls and to extend beyond said floor, means on said side walls and members defining laterally spaced generally parallel track surfaces above the level of said floor, hoist including a frame having load elevating and lowering means mounted thereon and laterally spaced wheels engaging said track surfaces, and means for limiting relative lateral movement between said wheels and track surfaces in both directions whereby said hoist frame establishes a longitudinally movable transverse connection between the upper portions of said side walls and members.

References Cited in the file of this patent

UNITED STATES PATENTS

| | | |
|---|---|---|
| 1,918,419 | Needham | July 18, 1933 |
| 2,381,958 | Inman | Aug. 14, 1945 |
| 2,387,542 | Taylor | Oct. 23, 1945 |
| 2,521,727 | Kappen | Sept. 12, 1950 |
| 2,557,253 | Belden | June 19, 1951 |
| 2,597,974 | Clarke | May 27, 1952 |
| 2,729,352 | Hodges et al. | Jan. 3, 1956 |
| 2,746,619 | Kuhlenschmidt et al. | May 22, 1956 |
| 2,751,095 | Haverstick et al. | June 19, 1956 |